(12) United States Patent
Wada et al.

(10) Patent No.: US 12,482,009 B2
(45) Date of Patent: Nov. 25, 2025

(54) DATA PROCESSING DEVICE, DATA PROCESSING METHOD, AND PRODUCTION SYSTEM

(71) Applicant: Yokogawa Electric Corporation, Tokyo (JP)

(72) Inventors: Kenichiro Wada, Musashino (JP); Takashi Sasaki, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 170 days.

(21) Appl. No.: 17/968,065

(22) Filed: Oct. 18, 2022

(65) Prior Publication Data

US 2023/0129033 A1  Apr. 27, 2023

(30) Foreign Application Priority Data

Oct. 26, 2021 (JP) ................ 2021-174278

(51) Int. Cl.
*G06Q 30/0201* (2023.01)
*G06F 17/18* (2006.01)

(52) U.S. Cl.
CPC ......... *G06Q 30/0201* (2013.01); *G06F 17/18* (2013.01)

(58) Field of Classification Search
CPC ............................. G06Q 30/0201; G06F 17/18
USPC ..................................................... 705/7.29
See application file for complete search history.

(56) References Cited

U.S. PATENT DOCUMENTS

| 5,718,060 A | 2/1998 | Mori | |
|---|---|---|---|
| 7,401,728 B2 * | 7/2008 | Markham | ............ G06Q 10/00 235/375 |
| 2002/0198621 A1 | 12/2002 | Sasaki et al. | |

FOREIGN PATENT DOCUMENTS

| JP | 01162889 A | * | 9/2000 |
|---|---|---|---|
| JP | 3094798 B2 | | 10/2000 |
| JP | 2005299028 A | * | 10/2005 |
| JP | 3734356 B2 | * | 1/2006 |

(Continued)

OTHER PUBLICATIONS

Japanese Office Action (JPOA) mailed on Feb. 20, 2024 and issued for Japanese patent application No. 2021-174278 and its English machine translation.

*Primary Examiner* — Abdallah A El-Hage Hassan
(74) *Attorney, Agent, or Firm* — RANKIN, HILL & CLARK LLP

(57) ABSTRACT

A data processing device includes: a collector that collects setting values in operating elements that control a production process for a product at prescribed intervals and collects brand information indicating a brand of the product; a first processor that performs a statistical process for the setting values, obtains representative values for the setting values as operation performance values while the product of the brand indicated in the brand information is being produced, and generates a performance value database; a second processor that performs a statistical process for operation performance values associated with brand information indicating a next brand to be produced in the production process among the operation performance values included in the performance value database, and obtains optimal setting values in the operating elements for producing the product of the next brand; and an outputter that outputs the obtained setting values.

18 Claims, 5 Drawing Sheets

(56) References Cited

FOREIGN PATENT DOCUMENTS

JP  4162864 B2  10/2008

\* cited by examiner

| TIME | BRAND | OPERATION PERFORMANCE VALUE |
|---|---|---|
| t1 | PAPER A | SV11, SV12, SV13 |
| t2 | PAPER B | SV21, SV22, SV23 |
| t3 | PAPER C | SV31, SV32, SV33 |
| t4 | PAPER A | SV41, SV42, SV43 |
| t5 | PAPER C | SV51, SV52, SV53 |
| ⋮ | ⋮ | ⋮ |

DB

DATA PROCESSING DEVICE, DATA PROCESSING METHOD, AND PRODUCTION SYSTEM

BACKGROUND OF THE INVENTION

Field of the Invention

The present invention relates to a data processing device, a data processing method, and a production system.

Priority is claimed on Japanese Patent Application No. 2021-174278, filed on Oct. 26, 2021, the contents of which are incorporated herein by reference.

Description of Related Art

In a plant where products are produced in continuous production, products of different brands (types) may be continuously produced by changing an input raw material amount, the mix of raw materials, operating conditions, and the like while the products are being produced. Here, the continuous production is referred to as a production method in which raw materials are continuously fed and the produced products are continuously taken out. Such plants include, for example, chemical plants and paper plants.

Japanese Patent No. 3094798 and Japanese Patent No. 4162864 disclose the inventions in which a setting value of the saturated vapor pressure for drying in a dryer in a papermaking process in a paper manufacturing plant is obtained in a simulation calculation process using a physical model of drying in the dryer based on a heat balance. In Japanese Patent No. 3094798 and Japanese Patent No. 4162864, when the brand of paper to be produced is changed (at the time of paper grade change), the setting value of the saturated vapor pressure of the dryer is predicted on the basis of the heat balance from a basis weight of the brand and a production speed.

Meanwhile, if a brand is changed during continuous production, a product in a transition period of the brand change is discarded as a loss or is collected and reused as a raw material. In order to reduce the number of such products, it is necessary to obtain an optimal setting value in each operating element for the next brand and shorten the transition period. However, in the methods disclosed in Japanese Patent No. 3094798 and Japanese Patent No. 4162864 (methods of determining setting values in the operating elements in a simulation calculation process using a physical model), there is a problem that it may be difficult to obtain optimal setting values due to an influence of factors that could not be assumed in the physical model and the like.

SUMMARY

A data processing device may include: a collector configured to collect setting values in operating elements that control a production process for a product at prescribed intervals and collect brand information indicating a brand of the product; a first processor configured to perform a statistical process for the setting values in the operating elements collected by the collector, obtain representative values for the setting values in the operating elements as operation performance values while the product of the brand indicated in the brand information is being produced, and generate a performance value database including the operation performance values associated with the brand information; a second processor configured to perform a statistical process for operation performance values associated with brand information indicating a next brand to be produced in the production process among the operation performance values included in the performance value database, and obtain optimal setting values in the operating elements for producing the product of the next brand; and an outputter configured to output the setting values obtained by the second processor.

Further features and aspects of the present disclosure will become apparent from the following detailed description of exemplary embodiments with reference to the attached drawings.

DETAILED DESCRIPTION

Figure 1:
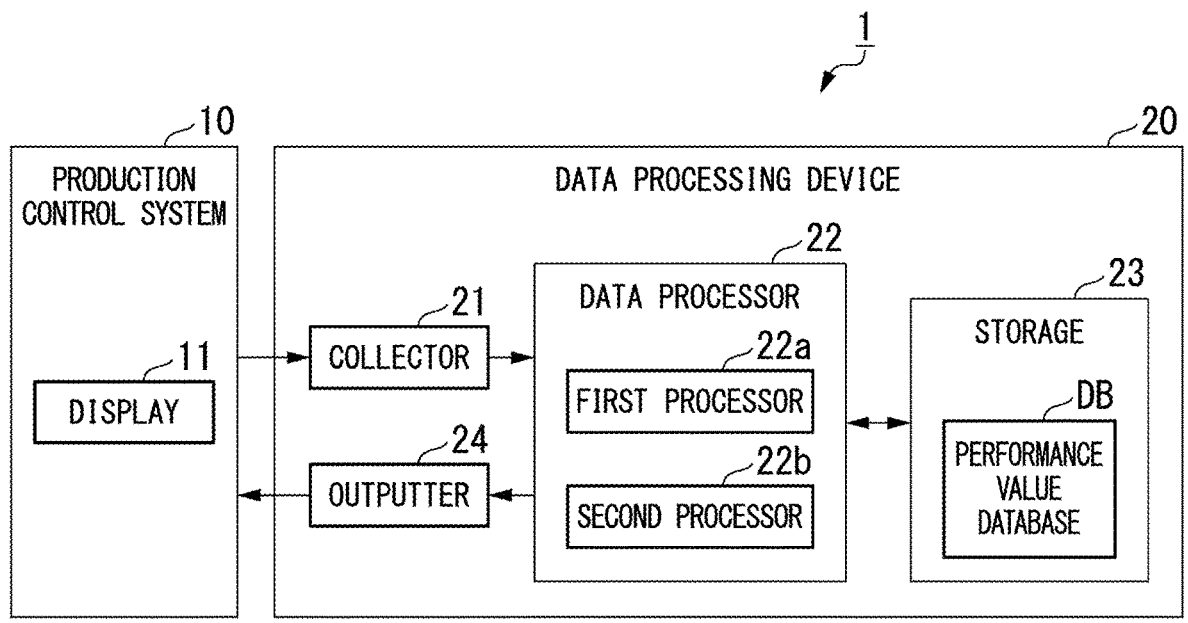
FIG. 1 is a block diagram showing a main configuration of a production system according to an embodiment of the present invention.

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a data processing device, a data processing method, and a production system capable of obtaining optimal setting values in operating elements when a brand is changed.

Hereinafter, a data processing device, a data processing method, and a production system according to embodiments of the present invention will be described in detail with reference to the drawings. Hereinafter, an overview of the present embodiment will first be described and then details of each embodiment will be described.

Overview

The embodiment of the present invention enables optimal setting values in operating elements to be obtained when a brand is changed. Generally, when a brand is changed, feedforward control is performed on each operating element such that the product quality reaches the quality of the brand after the change as soon as possible. It is necessary to obtain optimal setting values in the operating elements such that the feedforward control is performed. The embodiment of the present invention enables optimal setting values for such operating elements to be obtained.

Conventionally, for example, a setting value of a saturated vapor pressure for drying in a dryer in a papermaking process is obtained in simulation calculations using a physical model of the drying in the dryer based on the heat balance as in Japanese Patent No. 3094798 and Japanese Patent No. 4162864. It is necessary to accurately set parameters such as a heat transfer coefficient and specific heat of each layer involved in a heat transfer and to accurately model drying efficiency due to moisture evaporation and moisture content brought into the dryer such that a vapor pressure necessary for drying moisture from paper is accurately obtained in calculations using such a physical model.

However, it is strictly impossible to perfectly model all these physical phenomena. Even if the physical phenomena described above can be modeled, the parameters used in the model calculations will change with environmental conditions such as an ambient temperature and humidity or the mix of paper materials, such that it is significantly difficult to set optimal parameters all the time. Thus, methods using these physical models cannot sufficiently cope with long-term changes in production equipment, the addition of new brands, or the like even if parameters are tuned temporarily and it is difficult to obtain optimal setting values all the time.

In the embodiment of the present invention, optimal setting values are obtained all the time by performing the prediction (a black box model) of setting values in the operating elements based on a statistical method and past performance data instead of the prediction (a white box model) of setting values in the operating elements in physical calculations as in the prior art. Specifically, even if there are disturbance elements that cannot be ascertained or the optimal setting values changes gradually in facilities and processes, the optimal setting values in the operating elements are obtained in consideration thereof.

In the embodiment of the present invention, setting values in operating elements that control a production process for a product are first collected at prescribed intervals and brand information indicating a brand of the product is collected. Subsequently, a statistical process is performed for the collected setting values in the operating elements, representative values for the setting values in the operating elements are obtained as operation performance values while the product of the brand indicated in the brand information is being produced, and a performance value database including the operation performance values associated with the brand information is generated. A statistical process is performed for operation performance values associated with brand information indicating the next brand to be produced in the production process among operation performance values included in the performance value database and optimal setting values in the operating elements for producing the product of the next brand are obtained and output. Thereby, it is possible to obtain optimal setting values in operating elements when a brand is changed.

Details

<Production System>

FIG. 1 is a block diagram showing a main configuration of a production system according to an embodiment of the present invention. As shown in FIG. 1, a production system 1 of the present embodiment includes a production control system 10 and a data processing device 20 and produces a prescribed product through continuous production. Examples of products produced by the production system 1 in continuous production include paper, petrochemical products, and the like. In the present embodiment, for ease of understanding, it is assumed that the products continuously produced by the production system 1 are paper.

Figure 2:
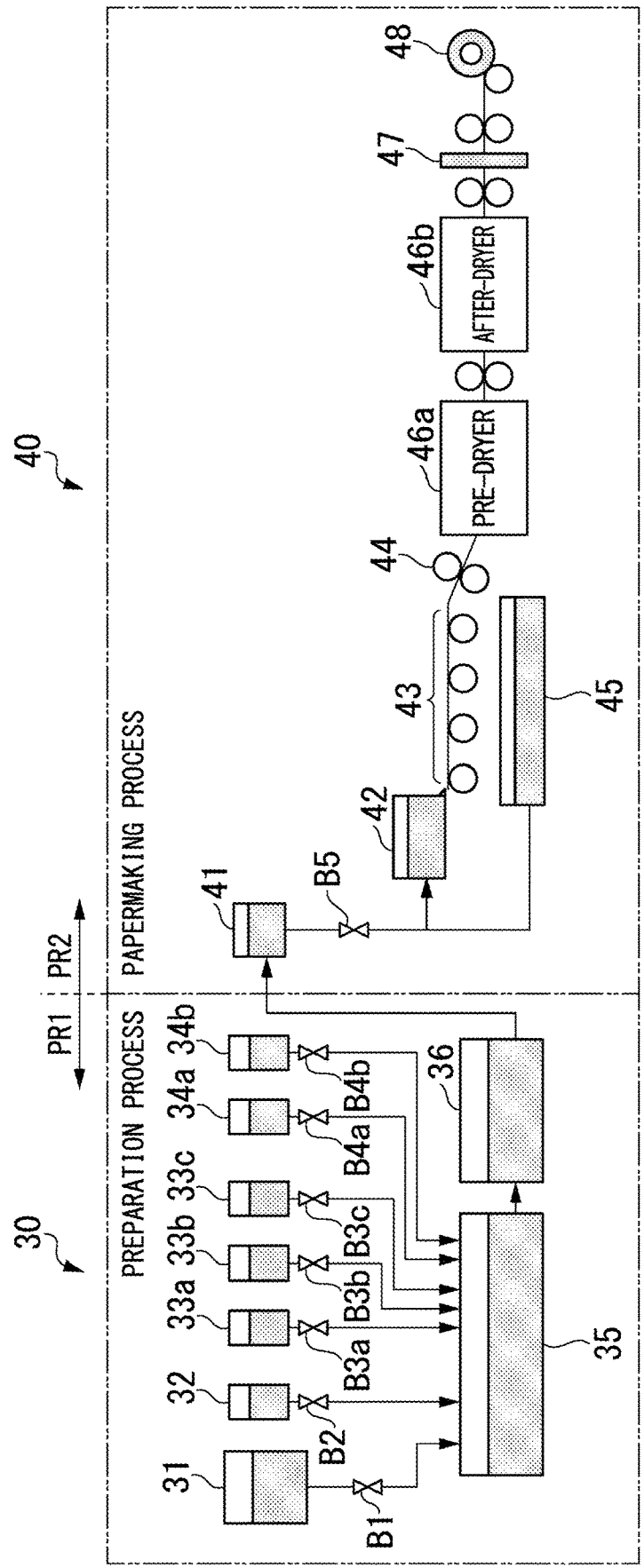
FIG. 2 is a diagram showing a part of a production process for paper to be produced by the production system according to the embodiment of the present invention.

FIG. 2 is a diagram showing a part of a production process of paper to be produced by the production system according to the embodiment of the present invention. As shown in FIG. 2, the paper production process includes a preparation process PR1 and a papermaking process PR2. The preparation process PR1 is a process of preparing a raw material to be used in the papermaking process PR2. In this process, fillers, dyes, chemicals, and the like are adjusted and mixed with the raw material for pulp. The papermaking process PR2 is a process of performing so-called papermaking. In this step, the raw materials prepared in the preparation process PR1 are supplied to a paper machine 40 for making paper.

The preparation device 30 for use in the preparation process PR1 includes a raw material tank 31, a filler tank 32, dye tanks 33a to 33c, chemical tanks 34a and 34b, a mixing chest 35, and a machine chest 36. A configuration in which the raw material for pulp stored in the raw material tank 31, a filler stored in the filler tank 32, dyes stored in the dye tanks 33a to 33c, and chemicals stored in the chemical tanks 34a and 34b can be supplied to the mixing chest 35 is adopted.

Specifically, the raw material for pulp stored in the raw material tank 31 is supplied to the mixing chest 35 by opening an operating valve B1. The filler stored in the filler tank 32 is supplied to the mixing chest 35 by opening an operating valve B2. The dyes stored in the dye tanks 33a to 33c are supplied to the mixing chest 35 by opening operating valves B3a to B3c. The chemicals stored in the chemical tanks 34a and 34b are supplied to the mixing chest 35 by opening operating valves B4a and B4b.

The raw material for pulp supplied from the raw material tank 31, the filler supplied from the filler tank 32, the dyes supplied from the dye tanks 33a to 33c, and the chemicals supplied from the chemical tanks 34a and 34b are mixed in the mixing chest 35. A mixture mixed in the mixing chest 35 is supplied to a seed box 41 of the papermaking process PR2 after papermaking chemicals such as sticky agents are added in the machine chest 36.

The paper machine 40 used in the papermaking process PR2 includes the seed box 41, a head box 42, a forming device 43, a dehydration device 44, a white water pit 45, a pre-dryer 46a, an after-dryer 46b, a quality measuring device 47, and a winding device 48. The seed box 41 is a container in which the raw material supplied from the preparation process PR1 is stored in a state in which a concentration thereof is being adjusted and the raw material is allowed to flow downward at a certain pressure. The raw material stored in the seed box 41 is supplied to the head box 42 when the seed inlet valve B5 is in an open state.

The head box 42 straightens the raw material supplied from the seed box 41 via the seed inlet valve B5 to a prescribed width and thickness and allows the straightened raw material to flow out toward the forming device 43 at a prescribed speed. The forming device 43 forms a paper layer by placing the raw material having flowed out from the head box 42 on a wire and dehydrating and filtering the raw material. This forming device 43 is a device that controls a so-called wire part. The dehydration device 44 mechanically compresses and dehydrates the paper layer formed by the forming device 43 and reduces the number of wire marks and the like to improve paper quality. This dehydration device 44 is a device that controls a so-called press part. The white water pit 45 is a storage tank in which water (white water) squeezed out by the forming device 43 and the dehydration device 44 is collected.

The pre-dryer 46a and the after-dryer 46b dry the paper layer supplied from the dehydration device 44 to reduce moisture contained in the paper layer to a prescribed moisture content. The pre-dryer 46a and the after-dryer 46b have generally similar configurations and include a plurality of steam drums heated by the introduction of steam therein. The paper layer supplied from the dehydration device 44 is dried by being sequentially wound around the plurality of steam drums provided in the pre-dryer 46a and the after-dryer 46b.

The quality measuring device 47 performs online measurement for the quality of the paper (paper as a product) supplied from the after-dryer 46b. Furthermore, the online measurement is a process of sequentially measuring the quality of produced paper without stopping paper production. The quality measuring device 47 includes a basis weight meter, a moisture meter, a paper thickness meter, an ash meter, a spectrophotometer, or the like using radiation (for example, X-rays and β rays), infrared rays, and the like. A basis weight [$g/m^2$], a moisture content [%], a thickness [μm], an ash content [%], a hue (for example, a hue in a CIELAB color space), and the like of the paper supplied from the after-dryer 46b are measured online. The winding device 48 is a device that winds the paper that has passed through the quality measuring device 47 in a roll shape.

The production control system 10 controls the production of paper as a product by controlling the preparation device 30 and the paper machine 40 shown in FIG. 2 and the like. As the production control system 10, for example, a distributed control system (DCS) in which a controller for controlling a field device (a measuring device or an operating device) is distributed for each of several control loops can be used.

The production control system 10 controls the production of paper as a product by adjusting the setting values in the operating elements that control the paper production process including the preparation process PR1 and the papermaking process PR2 shown in FIG. 2. Here, for example, the operating valves B2, B3a to B3c, B4a, and B4b can be mentioned as the operating elements in the preparation process PR1 shown in FIG. 2. An amount of filler (an amount of ash) to be added to the raw material is adjusted by a setting value in the operating valve B2, an amount of dye to be added to the raw material is adjusted by setting values in the operating valves B3a to B3c, and an amount of chemical to be added to the raw material is adjusted by setting values in the operating valves B4a and B4b.

Also, the operating elements in the papermaking process PR2 shown in FIG. 2 include, for example, the seed inlet valve B5, the head box 42 associated with a slice opening degree, and the pre-dryer 46a and the after-dryer 46b associated with saturated vapor pressures for drying. An amount of raw material to be supplied to the paper machine 40 is adjusted by the setting value for the seed inlet valve B5 and an amount of material to flow out from the head box 42 to the forming device 43 is adjusted by the setting value of the slice opening degree. Also, the temperatures of a plurality of steam drums provided in the pre-dryer 46a and the after-dryer 46b are adjusted by the saturated vapor pressure for drying.

The production control system 10 adjusts the setting values in the above-described operating elements with reference to a current state of the paper production process. Here, the current state of the paper production process includes measurement results (a basis weight, a moisture content, a thickness, an ash content, a hue, and the like of paper) of the quality measuring device 47 shown in FIG. 2, currently set values in the operating elements, and various types of measured values (a temperature, a pressure, a liquid level, and the like) other than the measurement results of the quality measuring device 47.

The production control system 10 outputs brand information indicating a brand of paper currently being produced to the data processing device 20. The production control system 10 outputs brand information indicating the next brand to be produced in the production process when the brand is changed while continuous production is being performed. Also, when setting values have been output from the data processing device 20 when a brand change is implemented, the production control system 10 displays the setting values as recommended values on the display 11 or controls paper production by setting the setting values in the operating elements.

<Data Processing Device>

The setting values output from the data processing device 20 are displayed on the display 11 of the production control system 10 such that optimal setting values in the operating elements when the brand is changed are presented as recommended values to an operator of the production plant. The paper production is controlled by setting the setting values output from the data processing device 20 in the operating elements such that automated control using the optimal setting values is implemented when the brand is changed and the transition period of the brand change is as short as possible.

The data processing device 20 includes a collector 21, a data processor 22, a storage 23, and an outputter 24 and obtains optimal setting values in operating elements when the brand is changed using various types of information obtained from the production control system 10. The data processing device 20 is, for example, communicatively connected to the production control system 10 via a network. Various types of information described above are collected via the network and the above-described optimal setting values are output to the production control system 10 via the network. Furthermore, the network may be a wired network or a wireless network. Each function in the data processing device 20 is implemented by a hardware processor such as a CPU (Central Processing Unit) executing a program.

The collector 21 collects setting values in the above-described operating elements from the production control system 10 at prescribed intervals (for example, one-second intervals or one-minute intervals) and collects brand information indicating a brand of paper currently being produced. Also, the collector 21 collects brand information indicating the next brand output from the production control system 10 when the brand is changed. In addition, the collector 21 may collect process data (data of a temperature, a pressure, a liquid level, and the like) obtained in the paper production process. Furthermore, an interval at which the process data is collected may be the same as or different from an interval at which the setting values in the operating elements described above are collected.

The data processor 22 includes a first processor 22a and a second processor 22b. The data processor 22 obtains optimal setting values in the operating elements when the brand is changed using the setting values in the operating elements and the brand information collected by the collector 21. The first processor 22a performs a statistical process for the setting values in the operating elements collected by the collector 21 and obtains representative values for the setting values in the operating elements as operation performance values while the product of the brand indicated in the brand information is being produced. The first processor 22a generates a performance value database DB including the operation performance values associated with the brand information.

Figures 3, 4:
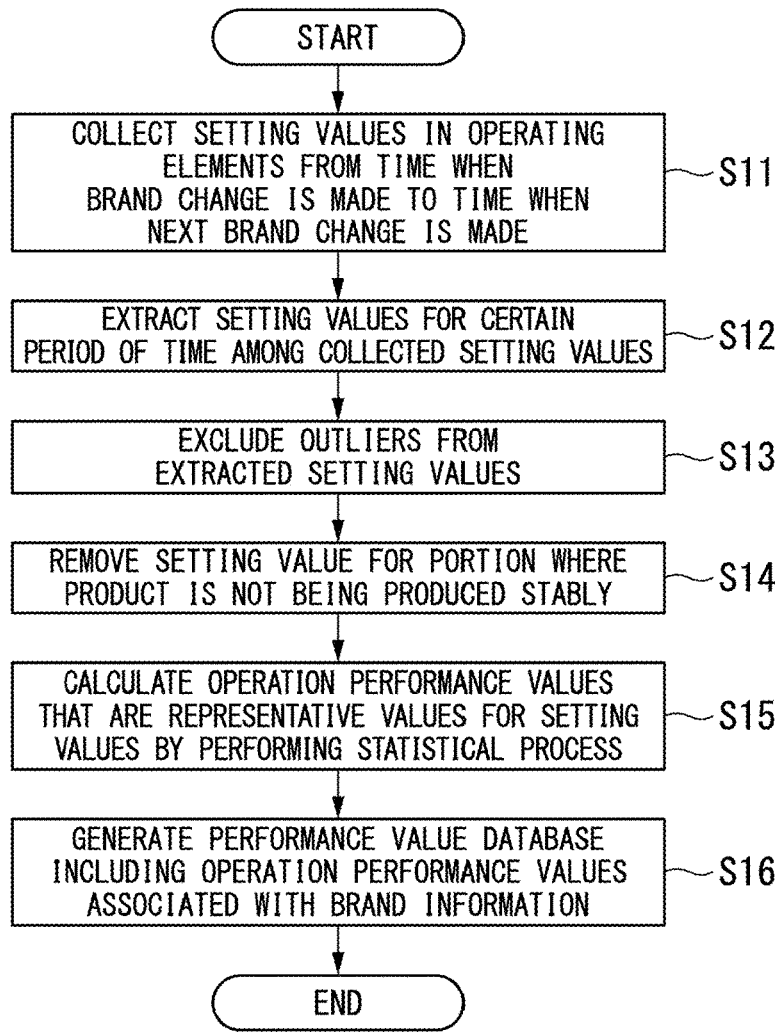
FIG. 3 is a diagram showing an example of a performance value database in the embodiment of the present invention.
FIG. 4 is a flowchart showing a database generation process performed by a data processing device according to the embodiment of the present invention.

FIG. 3 is a diagram showing an example of a performance value database in the embodiment of the present invention. In the performance value database DB illustrated in FIG. 3, "time," "brand," and "operation performance value" are associated. "Time" is the time when the product has been produced. As this time, for example, the time when production of the product has been started can be used. "Brand" is a brand of the product (paper). "Operation performance value" is a representative value for setting values in a plurality of operating elements.

For example, a first row of the performance value database DB illustrated in FIG. 3 shows that paper of the brand "paper A" is produced at time t1 and operation performance values in three operating elements prescribed at that time are SV11, SV12, and SV13. Also, a second row shows that paper of the brand "Paper B" is produced at time t2 and operation performance values in three operating elements prescribed at that time are SV21, SV22, and SV23. Furthermore, the three prescribed operating elements are, for example, the seed inlet valve B5 and the pre-dryer 46a and the after-dryer 46b associated with saturated vapor pressures for drying in the papermaking process PR2 shown in FIG. 2.

Here, the statistical process performed by the first processor 22a is, for example, a process of obtaining a mean value or a median value of the setting values in the operating elements collected by the collector 21. The first processor 22a performs the statistical process for setting values obtained when the product (paper) of the brand indicated in the brand information is stably produced among the setting values in the operating elements collected by the collector 21. This is because it is desirable that a representative value obtained using the setting values obtained when paper is stably produced instead of a representative value obtained using the setting values obtained when paper serving as a product is not stably produced be set as the operation performance value.

For example, at least one of the following determination methods can be used as a method of determining whether paper as a product is being produced stably.

Determination of whether the measurement result of the quality measuring device 47 (see FIG. 2) is within a target range Determination that a product flag (a non-defective product flag) indicating that a product with certain quality or higher is being produced is set on the basis of a measurement result of the quality measuring device 47 or other measuring devices (including an online or offline measuring device (not shown) and the like)

Determination that a flag indicating that a state of the production process is a non-production state, such as "brand change in progress," is not set Also, the first processor 22a performs a process of excluding setting values outside of a prescribed range among the setting values in the operating elements collected by the collector 21 before the above-described statistical process is performed. This is to exclude setting values that differ significantly during the transition period of the brand change as outliers. As a method of excluding outliers, for example, a quartile method can be used.

The second processor 22b performs a statistical process for operation performance values associated with brand information indicating the next brand to be produced in the production process among operation performance values included in the performance value database DB and obtains optimal setting values in the operating elements for producing the product of the next brand. For example, when the next brand to be produced in the production process is "Paper A," the second processor 22b obtains an optimal setting value in an operating element for producing "Paper A" by performing the statistical process for the operation performance values of the first row and the fourth row of the performance value database DB illustrated in FIG. 3.

Also, the second processor 22b performs the above-described statistical process for each operating element. For example, operation performance values SV11 and SV41 in the first and fourth rows of the performance value database DB illustrated in FIG. 3 are those in the seed inlet valve B5 shown in FIG. 2, operation performance values SV12 and SV42 are saturated vapor pressures for drying in the pre-dryer 46a shown in FIG. 2, and operation performance values SV13 and SV43 are saturated vapor pressures for drying in the after-dryer 46b shown in FIG. 2. The second processor 22b individually performs statistical calculations for the operation performance values SV11 and SV41, statistical calculations for the operation performance values SV12 and SV42, and statistical calculations for the operation performance values SV13 and SV43.

Here, the statistical process performed by the second processor 22b is, for example, a process for obtaining a mean value or a median value of the operation performance values or a weighted statistical process for the operation performance values (for example, a process for obtaining a weighted moving average, a process using a Kalman filter, or the like). Furthermore, the second processor 22b may perform a statistical process after weighting the operation performance values (for example, a weighting process of assigning a heavier weight to a newer operation performance value). Before the above-described statistical process is performed, the second processor 22b performs a process of excluding values outside of a prescribed range among the operation performance values associated with the brand information indicating the next brand to be produced in the production process. This is to obtain a more optimal setting value by excluding setting values that are significantly different from each other as outliers. As a method of excluding outliers, for example, a quartile method can be used.

The storage 23 stores the performance value database DB generated by the first processor 22a of the data processor 22. As the storage 23, for example, a volatile semiconductor memory such as a random-access memory (RAM) or a non-volatile semiconductor memory such as a flash memory can be used. Also, the storage 23 is not limited to a semiconductor memory and a hard disk drive (HDD), a solid-state drive (SSD), or the like can be used in addition to the semiconductor memory. The outputter 24 outputs the optimal setting values obtained by the second processor 22b of the data processor 22 to the production control system 10.

<Data Processing Method>

Next, an operation of the data processing device 20 according to the embodiment of the present invention will be described. The operation of the data processing device 20 is roughly divided into a process (hereinafter referred to as a "database generation process") of collecting setting values in the operating elements that control a paper production process and generating a performance value database DB and a process (hereinafter referred to as an "optimal setting value calculation process") of obtaining optimal setting values in the operating elements when a brand is changed using the performance value database DB. Details of these processes will be described in order below.

<<Database Generation Process>>

FIG. 4 is a flowchart showing a database generation process performed by the data processing device according to the embodiment of the present invention. Furthermore, the process of the flowchart shown in FIG. 4 is started every time the brand is changed in the paper production process. When the process is started, the collector 21 first collects setting values in operating elements from the time when a brand change is made to the time when the next brand change is made (step S11: collection step).

Specifically, during a period from the time when a brand change is made to the time when the next brand change is made, a process of collecting setting values in a plurality of operating elements is performed at prescribed intervals (for example, one-second intervals or one-minute intervals). The plurality of operating elements for which the setting values are collected include, for example, the seed inlet valve B5, the pre-dryer 46a, and the after-dryer 46b shown in FIG. 2. The collected setting values are recorded together with brand information indicating a brand of paper currently being produced.

Figure 5:
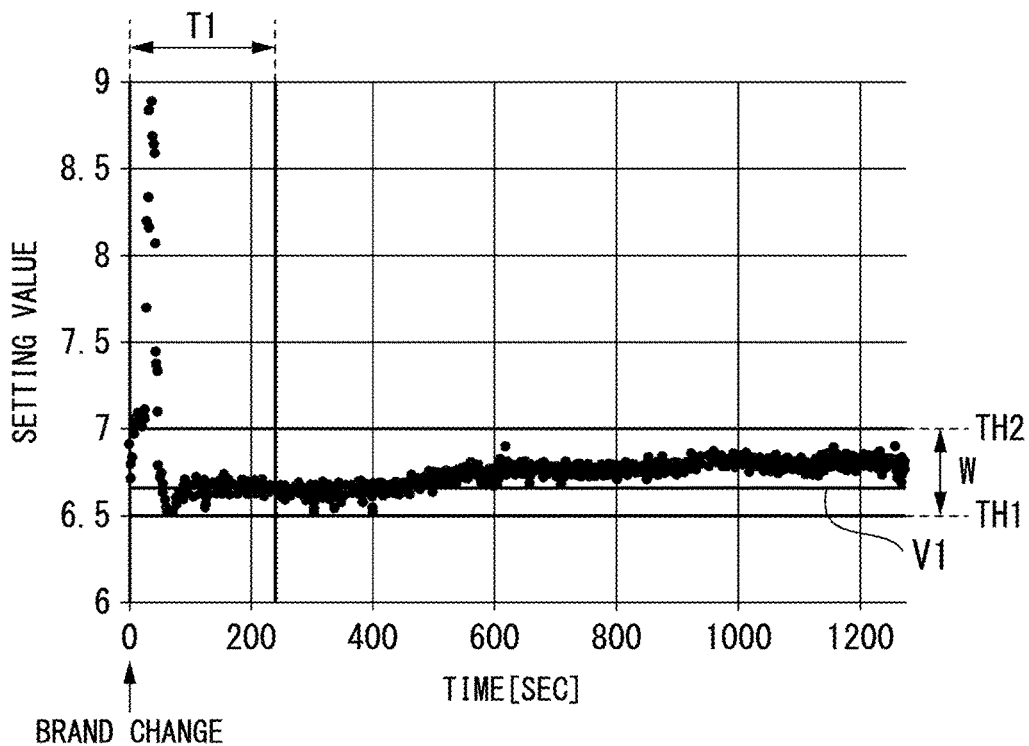
FIG. 5 is a diagram showing an example of setting values collected by the data processing device according to the embodiment of the present invention.

FIG. 5 is a diagram showing an example of setting values collected by the data processing device according to the embodiment of the present invention. In the graph shown in FIG. 5, the horizontal axis represents time and the vertical axis represents a setting value. The horizontal axis of the graph shown in FIG. 5 is based on the time when the brand has been changed and the time shown on the horizontal axis represents the elapsed time from the time when the brand has been changed. Furthermore, in FIG. 5, only a setting value in one operating element among setting values in a plurality of operating elements is shown. The setting value illustrated in FIG. 5 changes significantly until about 100 seconds have elapsed immediately after the brand change. Subsequently, a change over time in which the setting value is generally less than or equal to a certain value (the setting value becomes stable) is shown.

Subsequently, the first processor 22a performs a process of extracting setting values for a certain period of time from among the setting values in the plurality of operating elements collected by the collector 21 (step S12). For example, a process of extracting the setting values from among the setting values in the operating elements collected by the collector 21 until a prescribed period of time (for example, about several tens of minutes) elapses after the brand change is performed. This process is performed to limit the number of setting values for use in the statistical process performed by the first processor 22a such that the operation performance value is obtained. For example, in the example shown in FIG. 5, the setting values until approximately 1200 seconds (20 minutes) have elapsed from a point in time when the brand change was made are extracted.

Subsequently, a process of excluding outliers from extracted setting values is performed by the first processor 22a (step S13). Specifically, a process of excluding setting values outside of a prescribed range is performed. For example, a process of excluding setting values outside of a range (a prescribed range) W defined by a lower limit threshold TH1 and an upper limit threshold TH2 shown in FIG. 5 is performed. Furthermore, the lower limit threshold TH1 and the upper limit threshold TH2 may be set in a prescribed calculation (processing) method such as calculation using values of a first quartile, a third quartile, and a quartile range obtained in the quartile method from the extracted setting values or may be preset for each brand of paper. In the case of presetting for each brand of paper, for example, it is possible to perform a decision process on the basis of past setting values obtained for each brand of paper.

Subsequently, the first processor 22a performs a process of removing a setting value for a portion where a product is not being produced stably (step S14). For example, a process of removing a setting value obtained when a measurement result of the quality measuring device 47 (see FIG. 2) is not within a target range is performed. In the example shown in FIG. 5, setting values during a period T1 from the time when the brand is changed to the time when the measurement result of the quality measuring device 47 first enters the target range are removed. By performing this process, the setting values obtained when paper is stably produced remain.

Subsequently, a statistical process is performed for the setting values for which the above process has been performed and the first processor 22a performs a process of calculating the operation performance value that is a representative value for the setting values (step S15: first processing step). For example, the first processor 22a calculates a mean value or a median value of the setting values for which the above process has been performed as an operation performance value V1 shown in FIG. 5. Furthermore, the first processor 22a calculates the operation performance value for each of the plurality of operating elements for which the setting values have been collected.

When the above process is completed, the first processor 22a performs a process of generating the performance value database DB including operation performance values associated with brand information (step S16: first processing step). Specifically, a process of generating the performance value database DB in which the brand information indicating the brand of paper produced while the setting values are being collected is associated with each of the operation performance values calculated in step S15 is performed. Furthermore, as in the performance value database DB illustrated in FIG. 3, in addition to the brand information, time information indicating the time when the product has been produced may be associated with the operation performance value. The generated performance value database DB is stored in the storage 23. According to the above process, the performance value database DB is generated.

<<Optimal Setting Value Calculation Process>>

Figure 6:
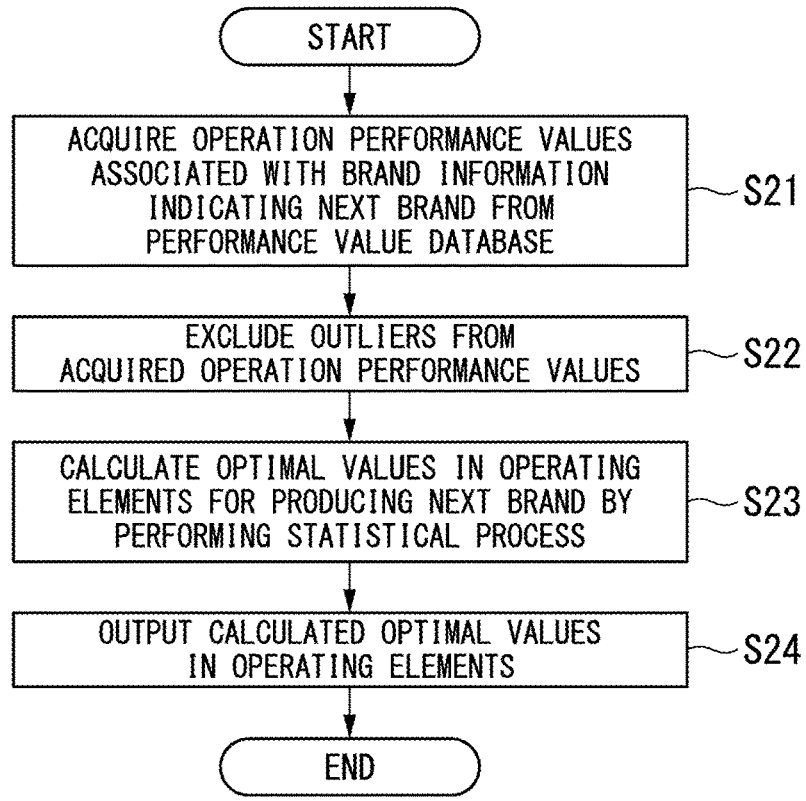
FIG. 6 is a flowchart showing an optimal setting value calculation process performed by the data processing device according to the embodiment of the present invention.

FIG. 6 is a flowchart showing an optimal setting value calculation process performed by the data processing device according to the embodiment of the present invention. A process of the flowchart shown in FIG. 6 is started every time the brand is changed in the paper production process. Furthermore, when the brand is changed, brand information indicating the next brand is output from the production control system 10 and collected by the collector 21 of the data processing device 20.

When the process is started, the second processor 22b first performs a process of acquiring an operation performance value associated with brand information that is the same as the brand information (brand information indicating the next brand) collected by the collector 21 from the performance value database DB (step S21). For example, when the brand information indicating the next brand collected by the collector 21 is "Paper A," the second processor 22b acquires the operation performance values of the first row and the fourth row of the performance value database DB shown in FIG. 3.

Subsequently, the second processor 22b performs a process of excluding outliers from operation performance values that have been acquired (step S22). In this process, for example, like the processing of step S13 shown in FIG. 4, a process of excluding an operation performance value outside of a range defined by the lower limit threshold and the upper limit threshold (a range similar to a range W defined by the lower limit threshold TH1 and the upper limit threshold TH2 shown in FIG. 5) is performed.

Figures 7, 8:
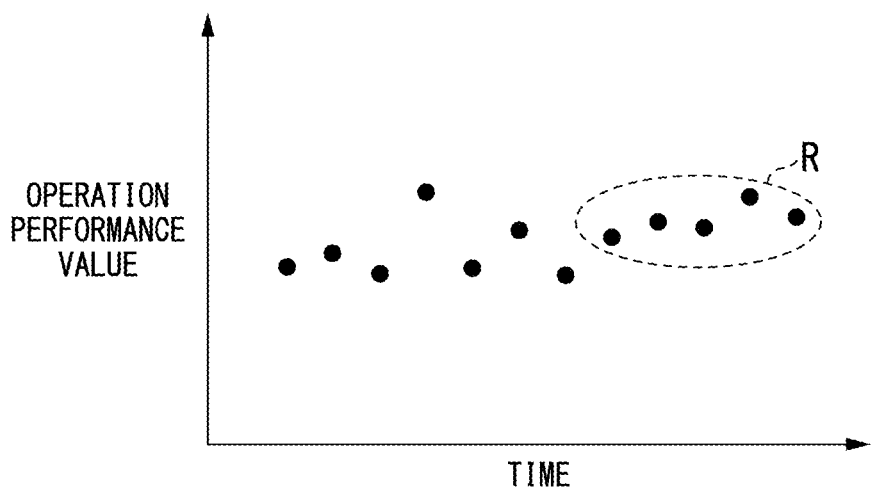
FIG. 7 is a diagram showing an example of operation performance values processed by the data processing device in the embodiment of the present invention.
FIG. 8 is an example in which optimal setting values are displayed in the embodiment of the present invention.

FIG. 7 is a diagram showing an example of operation performance values processed by the data processing device according to the embodiment of the present invention. Furthermore, in the graph shown in FIG. 7, the horizontal axis represents time and the vertical axis represents an operation performance value. Furthermore, in FIG. 7, as in FIG. 5, only one operation performance value of operation performance values in a plurality of operating elements is shown. By performing the processing of step S22, as shown in FIG. 7, the operation performance values (operation performance values from which outliers are excluded) when the brand identical to the next brand was produced in the past are arranged in chronological order.

Subsequently, the second processor 22b performs a process of obtaining optimal setting values in operating elements for producing paper of the next brand by performing a statistical process for the operation performance values for which the above process has been performed (step S23: second processing step). For example, the second processor 22b calculates optimal setting values in the operating elements in a process of obtaining a mean value or a median value of the latest operation performance values (operation performance values surrounded by the broken line indicated by reference sign R in FIG. 7) among the operation performance values for which the above process has been performed or a weighted statistical process (for example, a process of obtaining a weighted moving average, a process using a Kalman filter, or the like). Furthermore, the second processor 22b calculates an optimal setting value in each of the plurality of operating elements for which the operation performance values are collected.

When the above process is completed, the outputter 24 performs a process of outputting the calculated optimal setting values in the operating elements (step S24: output step). The optimal setting values in the operating elements output from the outputter 24 are input to the production control system 10 and displayed as recommended values on the display 11 or set in the operating elements, such that the next brand of paper is performed. According to the above process, the optimal setting values in the plurality of operating elements are calculated and used in the production control system 10.

FIG. 8 is an example in which optimal setting values are displayed in the embodiment of the present invention. In the example shown in FIG. 8, only setting values for an opening degree (a seed inlet valve opening degree) of the seed inlet valve B5, a saturated vapor pressure (a pre-vapor pressure) for drying in the pre-dryer 46a, and a saturated vapor pressure (an after-vapor pressure) for drying in the after-dryer 46b among the plurality of operating elements in the production plant are illustrated. In the example shown in FIG. 8, the display 11 of the production control system 10 displays the setting value (start) at the start of production and the current setting value (current) in each operating element. In addition to the setting values in the operating elements, the optimal setting values in the operating elements are displayed as "recommended values."

In this way, the display 11 of the production control system 10 displays the optimal setting values in the operating elements for producing the product of the next brand as recommended values when the brand is changed. Thus, an operator of the production plant can shorten a transition period for the brand change by changing the setting value to the displayed recommended value if necessary. Thereby, it is possible to reduce the number of products produced during the transition period (products that are discarded as losses or recovered and reused as raw materials). Furthermore, prediction based on a conventional physical model is also performed in parallel and prediction results are displayed on the display 11 in parallel with recommended values, such that the operator may select which one to use.

As described above, in the present embodiment, the operation performance values are obtained by performing the statistical process for the setting values in the operating elements collected at prescribed intervals and the performance value database DB including the operation performance values associated with the brand information is generated. Optimal setting values in the operating elements for producing a product of the next brand are obtained and output by performing the statistical process for the operation performance values associated with the brand information indicating the next brand among the operation performance values included in the performance value database DB. Thereby, it is possible to obtain the optimal setting values in the operating elements when the brand is changed while reflecting the latest operation situation all the time without depending on the accuracy of the physical model.

Also, in the present embodiment, representative values for the setting values set in the operating elements when a product of a certain brand is produced are stored as the operation performance values in the performance value database DB. When the product of the brand is produced again, the operation performance values obtained when the product of the brand has been produced in the past are read from the performance value database DB and used to calculate optimal setting values. Thereby, there is no need to manually record the setting values in the operating elements that have been set in the past, thereby reducing the burden on the operator of the production plant and preventing erroneous recording.

Although the data processing device, the data processing method, and the production system according to the embodiment of the present invention have been described above, the present invention is not limited to the above-described embodiment and can be freely modified within the scope of the present invention. For example, in the above-described embodiment, the first processor 22a of the data processing device 20 calculates the mean value or the median value of the setting values obtained when paper is stably produced as the operation performance value. However, the first processor 22a may use a setting value obtained when a product flag (a flag indicating that a product of certain quality or higher is being produced) is set for the first time as the operation performance value.

Also, before the first processor 22a of the data processing device 20 calculates the operation performance value, the setting value used for calculating the operation performance value may be corrected using information other than the setting value. Examples of setting value correction include the following corrections.

Correction of a filler addition rate corresponding to an addition rate of the reused product when the product produced during the transition period of the brand change is reused as a raw material Correction of an opening degree of the seed inlet valve B5 (see FIG. 2) corresponding to the speed of papermaking Correction of an opening degree of the seed inlet valve B5 corresponding to a seed concentration Correction of saturated vapor pressures for drying in the pre-dryer 46a and the after-dryer 46b corresponding to the speed of papermaking Also, before the second processor 22b of the data processing device 20 calculates the optimal setting value, the operation performance value used for calculating the optimal setting value may be corrected using information other than the operation performance value. Correction examples of the operation performance value include, for example, those similar to the above-described correction examples.

Supplementary Note

According to an aspect of the present invention, there is provided a data processing device (20) which may include: a collector (21) configured to collect setting values in operating elements that control a production process for a product at prescribed intervals and collect brand information indicating a brand of the product; a first processor (22a) configured to perform a statistical process for the setting values in the operating elements collected by the collector, obtain representative values for the setting values in the operating elements as operation performance values while the product of the brand indicated in the brand information is being produced, and generate a performance value database (DB) including the operation performance values associated with the brand information; a second processor (22b) configured to perform a statistical process for operation performance values associated with brand information indicating a next brand to be produced in the production process among the operation performance values included in the performance value database, and obtain optimal setting values in the operating elements for producing the product of the next brand; and an outputter (24) configured to output the setting values obtained by the second processor.

Also, in the data processing device according to the aspect of the present invention, the statistical process performed by the first processor is a process of obtaining a mean value or a median value of the setting values in the operating elements collected by the collector.

Also, in the data processing device according to the aspect of the present invention, the first processor is configured to perform the statistical process for setting values obtained when the product of the brand indicated in the brand information is stably produced, among the setting values in the operating elements collected by the collector.

Also, in the data processing device according to the aspect of the present invention, in a case where a measurement result of a quality of the product is within a target range, the first processor is configured to determine that the product of the brand indicated in the brand information is stably produced.

Also, in the data processing device according to the aspect of the present invention, in a case where a product flag indicating that the product with certain quality or higher is being produced is set on the basis of a measurement result of a quality of the product, the first processor is configured to determine that the product of the brand indicated in the brand information is stably produced.

Also, in the data processing device according to the aspect of the present invention, in a case where a flag indicating that a state of the production process is a non-production state is not set, the first processor is configured to determine that the product of the brand indicated in the brand information is stably produced.

Also, in the data processing device according to the aspect of the present invention, the first processor is configured to perform a process of excluding setting values outside of a prescribed range among the setting values in the operating elements collected by the collector before the statistical process is performed.

Also, in the data processing device according to the aspect of the present invention, the statistical process performed by the second processor is a weighted statistical process or a process for obtaining a mean value or a median value of the operation performance values associated with the brand information indicating the next brand to be produced in the production process.

Also, in the data processing device according to the aspect of the present invention, the second processor is configured to perform a process of excluding operation performance values outside of a prescribed range among the operation performance values associated with the brand information indicating the next brand to be produced in the production process before the statistical process is performed.

According to an aspect of the present invention, there is provided a data processing method which may include: a collection step (S11) of collecting setting values in operating elements that control a production process for a product at prescribed intervals and collecting brand information indicating a brand of the product; a first processing step (S15 and S16) of performing a statistical process for the setting values in the operating elements collected in the collection step, obtaining representative values for the setting values in the operating elements as operation performance values while the product of the brand indicated in the brand information is being produced, and generating a performance value database (DB) including the operation performance values associated with the brand information; a second processing step (S23) of performing a statistical process for operation performance values associated with brand information indicating the next brand to be produced in the production process among operation performance values included in the performance value database, and obtaining optimal setting values in the operating elements for producing the product of the next brand; and an output step (S24) of outputting the setting values obtained in the second processing step.

Also, in the data processing method according to the aspect of the present invention, the statistical process performed in the first processing step is a process of obtaining a mean value or a median value of the setting values in the operating elements collected in the collection step.

Also, the data processing method according to the aspect of the present invention, may further include: in the first processing step, performing the statistical process for setting values obtained when the product of the brand indicated in the brand information is stably produced, among the setting values in the operating elements collected by in collection step.

Also, the data processing method according to the aspect of the present invention, may further include: in the first processing step, in a case where a measurement result of a quality of the product is within a target range, determining that the product of the brand indicated in the brand information is stably produced.

Also, the data processing method according to the aspect of the present invention, may further include: in the first processing step, in a case where a product flag indicating that the product with certain quality or higher is being produced is set on the basis of a measurement result of a quality of the product, determining that the product of the brand indicated in the brand information is stably produced.

Also, the data processing method according to the aspect of the present invention, may further include: in the first processing step, in a case where a flag indicating that a state of the production process is a non-production state is not set, determining that the product of the brand indicated in the brand information is stably produced.

Also, the data processing method according to the aspect of the present invention, may further include: in the first processing step, performing a process of excluding setting values outside of a prescribed range among the setting values in the operating elements collected in the collection step before the statistical process is performed.

Also, in the data processing method according to the aspect of the present invention, the statistical process performed in the second processing step is a weighted statistical process or a process for obtaining a mean value or a median value of the operation performance values associated with the brand information indicating the next brand to be produced in the production process.

Also, the data processing method according to the aspect of the present invention, may further include: in the second processing step, performing a process of excluding operation performance values outside of a prescribed range among the operation performance values associated with the brand information indicating the next brand to be produced in the production process before the statistical process is performed.

According to an aspect of the present invention, there is provided a production system (1) which may include: the above-described data processing device (20); and a production control system (10) configured to display the setting values output from the data processing device as recommended values on a display (11), and control a production of the product by setting the setting values output from the data processing device in the operating elements.

Also, the production system according to the aspect of the present invention is a system for controlling a paper machine (40) for producing paper as the product, and the data processing device is configured to collect, as the setting values in the operating elements, at least one of an opening degree of a seed inlet valve (B5) for supplying a raw material for pulp to the paper machine and a saturated vapor pressure for drying in a dryer (46a and 46b) provided in the paper machine.

According to the present invention, it is possible to obtain optimal setting values in operating elements when a brand is changed.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus-function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A production system comprising:
a data processing device; and
a production control system,
wherein the data processing device comprising:
a collector configured to collect setting values in operating elements that control a production process for a product at prescribed intervals from a time when a brand change is made to a time when a next brand change is made, and collect brand information indicating a brand of the product, materials being continuously fed and the product being continuously produced;
a first processor configured to perform a statistical process for the setting values in the operating elements collected by the collector, obtain representative values for the setting values in the operating elements as operation performance values while the product of the brand indicated in the brand information is being produced, and generate a performance value database including the operation performance values associated with the brand information of the product produced while the setting values are collected;
a second processor configured to perform a statistical process for operation performance values associated with brand information indicating a next brand to be produced in the production process among the operation performance values included in the performance value database, and obtain optimal setting values in the operating elements for producing the product of the next brand; and
an outputter configured to output the setting values obtained by the second processor to the production control system,
wherein the production system produces the product of the next brand by using the setting values output from the data processing device in the operating elements with a control by the production control system.

2. The production system according to claim 1,
wherein the statistical process performed by the first processor is a process of obtaining a mean value or a median value of the setting values in the operating elements collected by the collector.

3. The production system according to claim 1,
wherein the first processor is configured to perform the statistical process for setting values obtained when the product of the brand indicated in the brand information is stably produced, among the setting values in the operating elements collected by the collector.

4. The production system according to claim 3,
wherein in a case where a measurement result of a quality of the product is within a target range, the first processor is configured to determine that the product of the brand indicated in the brand information is stably produced.

5. The production system according to claim 3,
wherein in a case where a product flag indicating that the product with certain quality or higher is being produced is set on the basis of a measurement result of a quality of the product, the first processor is configured to determine that the product of the brand indicated in the brand information is stably produced.

6. The production system according to claim 2,
wherein the first processor is configured to perform a process of excluding setting values outside of a prescribed range among the setting values in the operating elements collected by the collector before the statistical process is performed.

7. The production system according to claim 1,
wherein the statistical process performed by the second processor is a weighted statistical process or a process for obtaining a mean value or a median value of the operation performance values associated with the brand information indicating the next brand to be produced in the production process.

8. The production system according to claim 1,
wherein the second processor is configured to perform a process of excluding operation performance values outside of a prescribed range among the operation performance values associated with the brand information indicating the next brand to be produced in the production process before the statistical process is performed.

9. A method for producing a product performed by a production system that comprises a data processing device and a production control system, the method comprising:
a collection step, by the data processing device, of collecting setting values in operating elements that control a production process for a product at prescribed intervals from a time when a brand change is made to a time when a next brand change is made, and collecting brand information indicating a brand of the product, materials being continuously fed and the product being continuously produced;
a first processing step, by the data processing device, of performing a statistical process for the setting values in the operating elements collected in the collection step, obtaining representative values for the setting values in the operating elements as operation performance values while the product of the brand indicated in the brand information is being produced, and generating a performance value database including the operation performance values associated with the brand information of the product produced while the setting values are collected;
a second processing step, by the data processing device, of performing a statistical process for operation performance values associated with brand information indicating the next brand to be produced in the production process among operation performance values included in the performance value database, and obtaining optimal setting values in the operating elements for producing the product of the next brand;
an output step, by the data processing device, of outputting the setting values obtained in the second processing step to the production control system; and
a production step, by the production system, of producing the product of the next brand by using the setting values output from the data processing device in the operating elements with a control by the production control system.

10. The method according to claim 9,
wherein the statistical process performed in the first processing step is a process of obtaining a mean value or a median value of the setting values in the operating elements collected in the collection step.

11. The method according to claim 9, further comprising:
in the first processing step, performing the statistical process for setting values obtained when the product of the brand indicated in the brand information is stably produced, among the setting values in the operating elements collected by in collection step.

12. The method according to claim 11, further comprising:
in the first processing step, in a case where a measurement result of a quality of the product is within a target range, determining that the product of the brand indicated in the brand information is stably produced.

13. The method according to claim 11, further comprising:
in the first processing step, in a case where a product flag indicating that the product with certain quality or higher is being produced is set on the basis of a measurement result of a quality of the product, determining that the product of the brand indicated in the brand information is stably produced.

14. The method according to claim 10, further comprising:
in the first processing step, performing a process of excluding setting values outside of a prescribed range among the setting values in the operating elements collected in the collection step before the statistical process is performed.

15. The method according to claim 9,
wherein the statistical process performed in the second processing step is a weighted statistical process or a process for obtaining a mean value or a median value of the operation performance values associated with the brand information indicating the next brand to be produced in the production process.

16. The method according to claim 9, further comprising:
in the second processing step, performing a process of excluding operation performance values outside of a prescribed range among the operation performance values associated with the brand information indicating the next brand to be produced in the production process before the statistical process is performed.

17. The production system according to claim 1,
wherein the production control system is configured to display the setting values output from the data processing device as recommended values on a display.

18. The production system according to claim 17,
wherein the production control system is a system for controlling a paper machine for producing paper as the product, and
wherein the data processing device is configured to collect, as the setting values in the operating elements, at least one of an opening degree of a seed inlet valve for supplying a raw material for pulp to the paper machine and a saturated vapor pressure for drying in a dryer provided in the paper machine.

* * * * *